Patented Apr. 17, 1928.

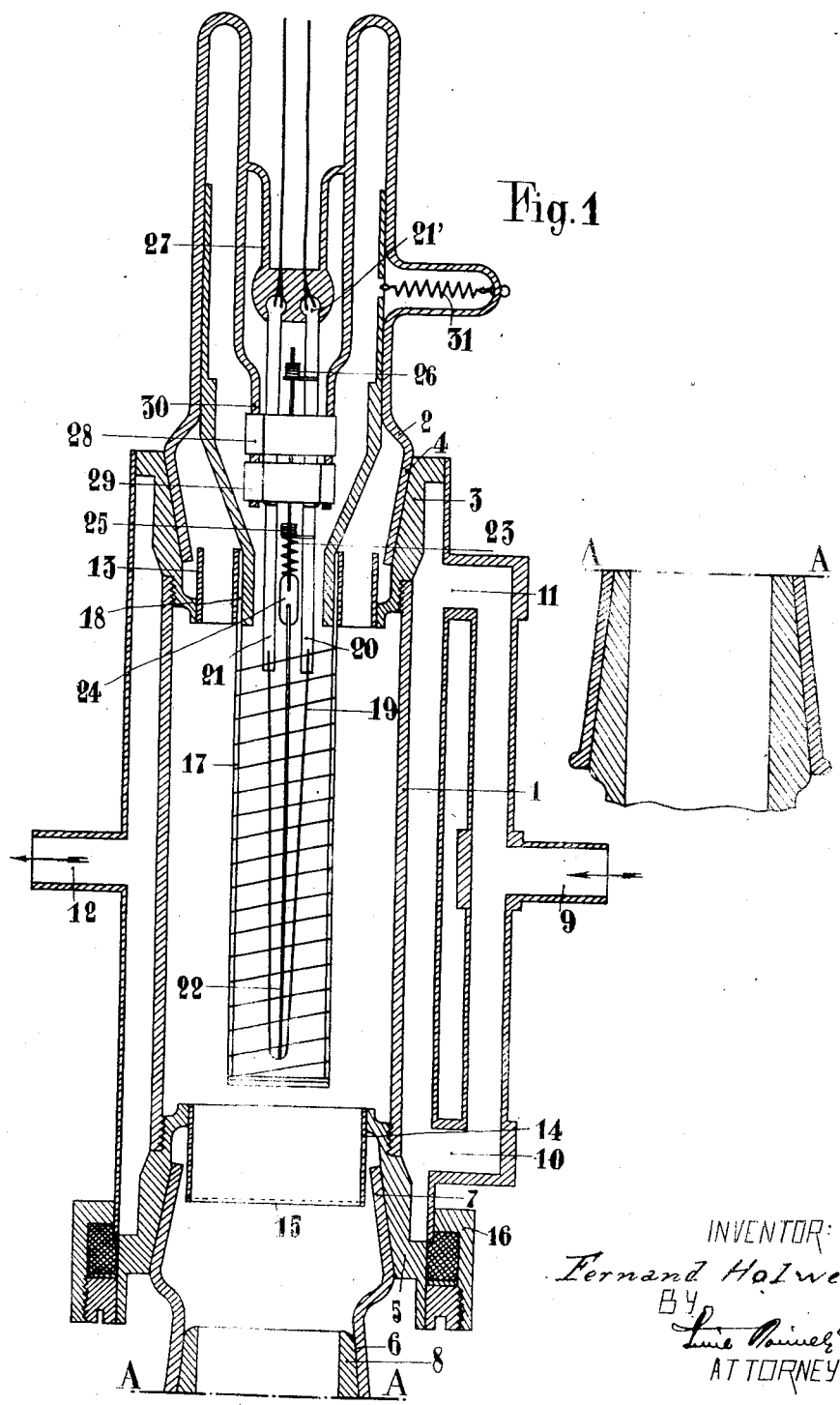

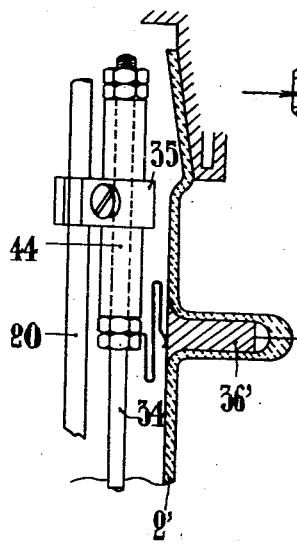
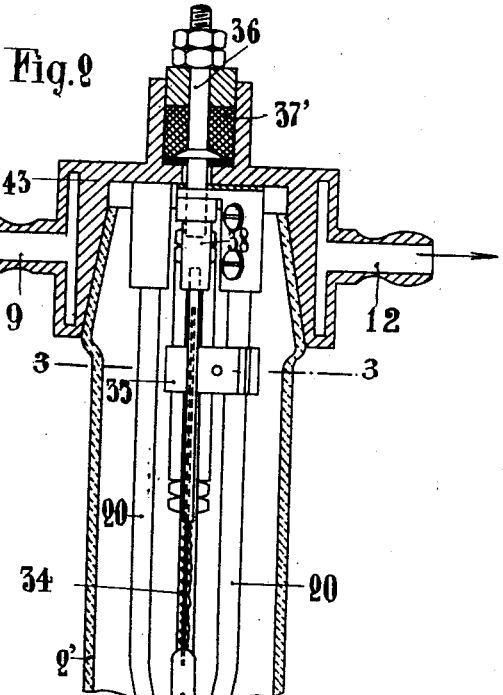
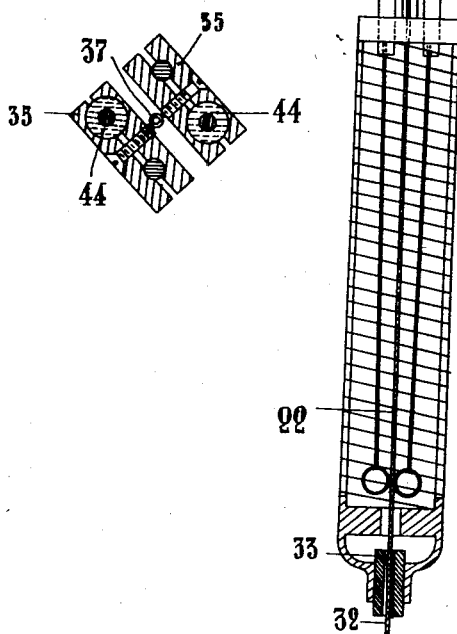

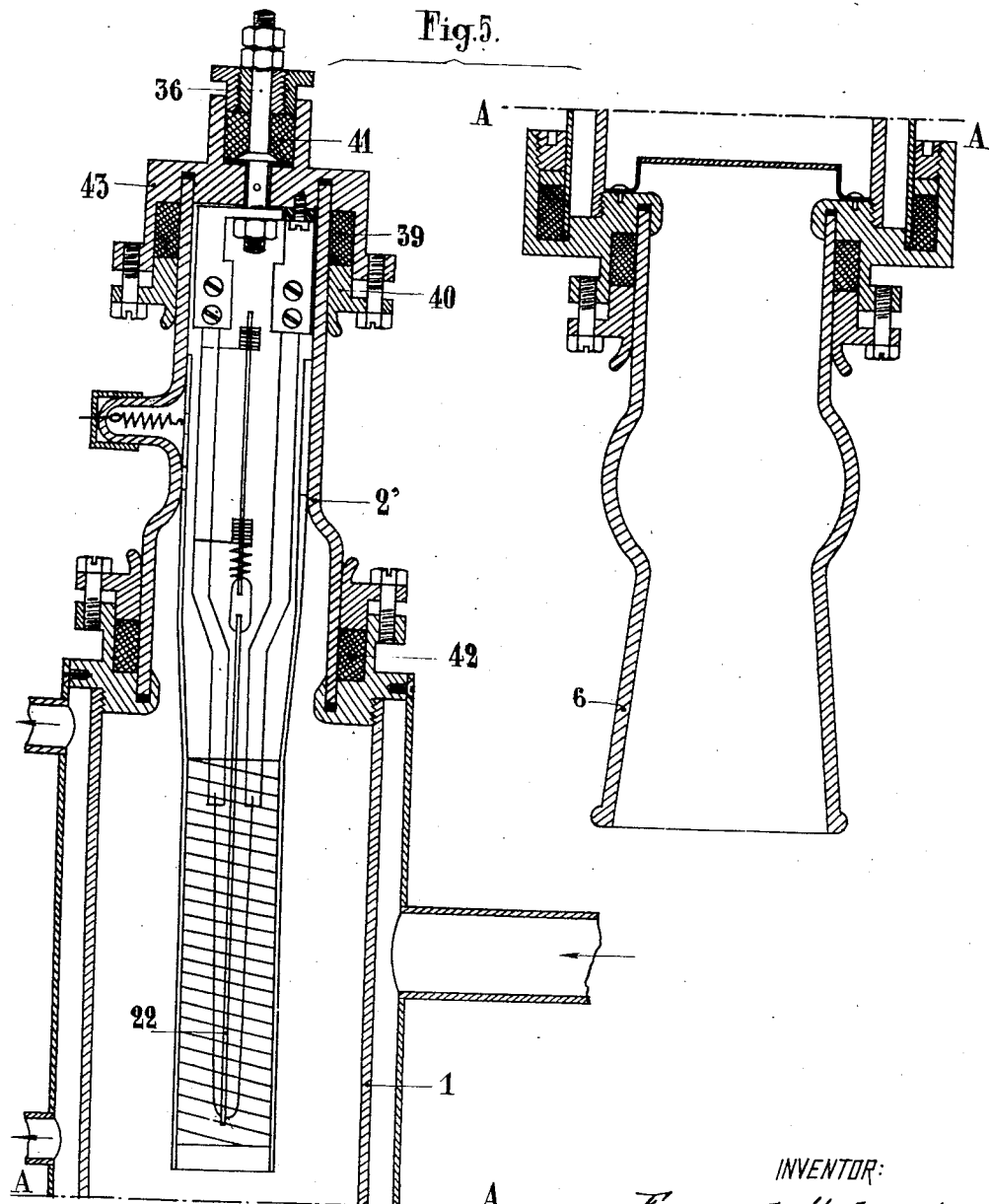

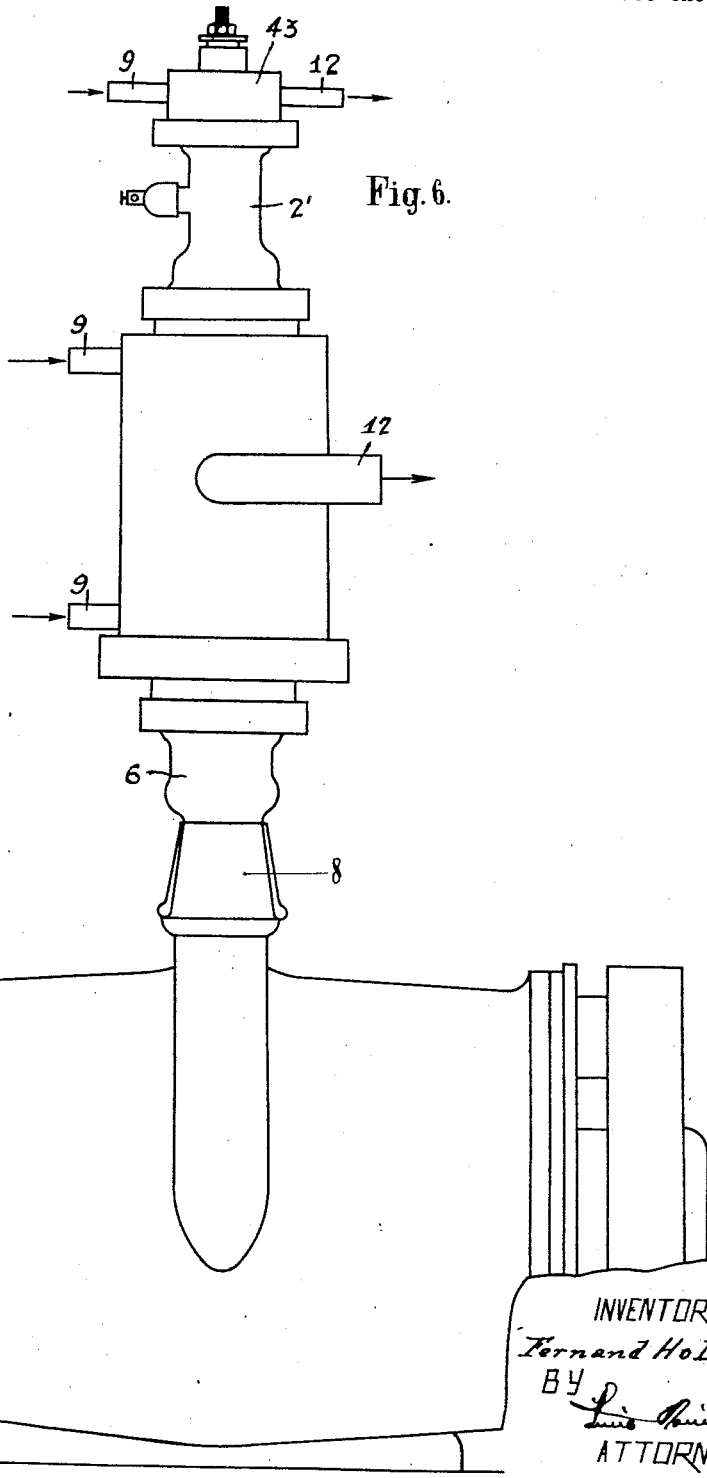

1,666,450

UNITED STATES PATENT OFFICE.

FERNAND HOLWECK, OF PARIS, FRANCE.

THERMIONIC APPARATUS.

Application filed October 22, 1923, Serial No. 670,188, and in France October 27, 1922. Renewed March 9, 1928.

This invention relates to improvements in thermionic apparatus.

The high vacuum themionic apparatus at present in use are: thermionic valves, valves employed in wireless telegraphy and radio telephony and electron discharge tubes.

This apparatus in which a very high vacuum is essential, comprises generally an entirely closed glass casing or sometimes, a casing of glass and metal in which the two parts are sealed or fused together. The internal vacuum is produced once and for all by the manufacturer, so that even a very slight internal damage entails the total loss of the apparatus which may be a very expensive one. Moreover great difficulties are encountered in manufacturing a high capacity apparatus in glass in view of the considerable quantities of heat which have to be removed from the casing within which the vacuum exists.

The present invention aims at overcoming the above drawbacks in all types of thermionic apparatus irrespective of the number of their electrodes.

The improvements according to the invention consist essentially in joining the different metallic and insulating parts of the apparatus by demountable and gas-tight joints. Moreover the vacuum instead of being produced in the apparatus once and for all by the manufacturer is only produced at the moment when the valve is to be employed, for which purpose the valve is connected to any suitable vacuum pump preferably of such a type as can be stopped without entailing an initial re-entry of air.

In order to understand the invention more clearly, reference is made to the accompanying drawings which show by way of example various embodiments of a three-electrode valve to which the improvements forming the object of the present invention have been applied. It should, however, be well understood that these improvements may be applied to all kinds of thermionic apparatus irrespective of the number of their electrodes.

In the drawings:—

Figure 1 is a vertical section of one embodiment.

Figure 2 is a vertical section of a modification.

Figure 3 is a horizontal section on line 3—3, Figure 2.

Figure 4 is a detail view showing the external electric contact of the grid.

Figure 5 is a vertical sectional view of another modification.

Figure 6, shows a valve constructed in accordance with the present invention, mounted on a vacuum pump.

In Figure 1, 1 indicates the metallic member constituting the plate or anode of the apparatus.

2 is an insulating tube supporting the grid and the filament which has to be connected by a tight joint to the plate 1. For this purpose a sleeve 3 is fixed at the upper end of the plate 1 by any suitable means. This sleeve comprises a frusto-conically bored part adapted to engage frictionally a member 4 of corresponding shape carried by the aforesaid tube 2. The sleeve 3 may, if desired, be made integral with the tube 1 during the course of manufacture.

5 indicates a supporting member similarly fixed to the lower end of the plate 1 and connected to the tube 6 by means of a frusto-conically bored part analogous to that of the sleeve 3, the tube terminating in a part 7 of a shape corresponding to that of the bored part. The tightness of the connections is assured for example by means of valve grease (a mixture of equal parts of caoutchouc, vaseline and paraffin) or by any other suitable composition.

8 indicates the suction tube of the vacuum pump similarly connected frictionally to the tube 6. This latter member, which is made of insulating material, may be dispensed with and the plate may be connected directly to the pump if the purpose for which the valve is used allows the anode to be earthed.

The plate is cooled by the circulation of any suitable fluid. The cold fluid enters at 9 and passes through the openings 10 and 11, around the sleeves 3 and 5 therby preventing any rise in temperature.

After cooling the plate 1, against which the electrons emitted by the filament impinge, the cooling fluid passes out through the exit tube 12, the central part of the plate being adapted to be heated without any detrimental effect.

Suitable partitions, baffles or the like may be arranged in the annular space through which the cooling fluid circulates in order to assist the cooling.

Particular care has been taken in connection with the conical sleeves in order to prevent the composition ensuring the tightness of the apparatus, interposed between the members 3 and 4 on the one hand and 5 and 7 on the other hand, from soiling the interior of the plate 1 and from being bombarded by electrons. For this purpose tubes 13 and 14 adapted to protect the interior of the plate 1 are provided. As these protecting tubes are demountable and as the members 3 and 5 no longer present re-entering angles, the connecting sleeves can be easily cleaned.

The guard tube 14 may carry at 15 a grid forming an electrical termination of the plate in order to prevent parasitic discharge losses towards the pump.

An expansion joint 16 comprises a rubber ring or a suitable resilient metallic member ensures the necessary play for the external casing of the plate.

17 indicates the grid fixed on a demountable spport 18 carried by a sleeve frictionally engaging with the tube 2.

The filament 19 is carried by metallic rods 20 and 21 fastened at 21' in a socket 27 integral with the tube 2 and is stretched by a stem 22 subjected to the action of a spring 23 insulated by a bead 24 of glass or any other suitable material. This stem is guided by two sleeves 25 and 26.

The current connections are effected in the usual manner through the socket 27. The rods 20 and 21 are supported by rings 28 and 29 surrounding the wall 30 of the member 2, and are soldered thereto or fixed in any other manner.

31 is a current lead for the grid.

Figures 2, 3 and 4 show another method of mounting the filament and the grid, having numerous advantages over that previously described. In this modification the glass member 2, shown in Figure 1, is replaced by a glass member 2' and a metallic head 43 supporting the grid and the filament.

This arrangement enables:—

1. A better guiding of the end of the filament in such a manner as to keep the central part hot.

For this purpose a central support 22 of a refractory metal, is provided beneath the two filament supports with a prolongation 32 sliding freely in an insulating member 33 carried by the end of the grid. The member 33 may for example consist of a small tube of quartz.

2. An easier centering of the filament in relation to the grid by mounting the grid support on the metallic member 43 (at the top of the valve) and not on the glass tube 2 as shown in Figure 1. The insulating support for the grid may consist of two glass tubes 44 fixed between nuts screwed on the rods 34 and held at their middle by a clamp 35 connecting the grid supports with the filament supports.

3. Only one of the joints need be dismounted when replacing the filament. For this purpose the external electric contact of the grid is effected through a gliding contact formed by a suitable spring integral with the grid support 34 bearing against a metallic contact 36' fixed in the insulating member 2'.

The head 43 is cooled either by fluid circulating between 9 and 12, or by any other suitable means, as the connection is not adapted to be subjected to increases of temperature.

The central electrode may be rendered gas-tight by means of a molten resinous or other substance indicated by 37'.

Another method of ensuring the gas-tight connection of the various insulating and metallic members of the valve consists in employing plastic joints.

Figure 5 shows a valve constructed in accordance with this principle.

The metallic head 43 is connected to the insulating tube 2' by means of a ring 39 of plastic material, preferably rubber, compressed by a stuffing box gland 40.

The gas tightness of the connection of the rod 36 as well as that of the connection of the tube 2' with the metallic plate 1, can be effected in a similar manner by means of the rings 41, 42 respectively.

The insulating tube 6 is connected to the plate in the same manner.

Springs placed beneath the gland ensure a compression on the packing independent of its volume.

Figure 6 illustrates a valve constructed in accordance with the present invention in conjunction with a vacuum pump.

In order too obtain the highest efficiency, it is possible in certain cases, that the tube should not be exhausted to the extreme limit produced by the pump, but that a slightly higher pressure may be used.

This result may be obtained for instance by decreasing the speed of the pump, by increasing the pressure of the gas at the evacuating portion, by establishing a controllable communication between the preliminary vacuum and the actual vacuum, or merely by closing the connection between the pump and the valve to a greater or less extent by means of a cock or the like which may advantageously be operated magnetically from the exterior of the tube. The use of a helicoidal tight pump allows the whole viz, valve and pump, to operate in gases other than air.

I claim—

Thermionic apparatus, comprising a three-electrode valve, a pump for creating a vacuum at will in the valve, and a tube of large diameter but short length connecting the valve and pump together to form a single unit and having gas-tight, frusto-conical joints with said valve and pump; said valve embodying a metallic head whereon the electrodes are mounted, an insulating sleeve separating said head from the plate electrode, a frusto-conical joint surmounting the sleeve, and means for supplying cool water to cool the valve joints.

In testimony whereof I affix my signature.

FERNAND HOLWECK.